April 30, 1935.  A. H. BOYD  1,999,533
PROCESS OF DRYING PRUNES
Filed Sept. 9, 1931

INVENTOR
BY A. H. BOYD
E. L. Birkenbeuel
ATTORNEY

Patented Apr. 30, 1935

1,999,533

UNITED STATES PATENT OFFICE 1,999,533

PROCESS OF DRYING PRUNES

Albert H. Boyd, Newberg, Oreg.

Application September 9, 1931, Serial No. 561,849

4 Claims. (Cl. 99—5)

This invention relates generally to dried fruits, and particularly to prunes and a process for drying same.

The main object of this invention is the production of a dried prune of superior quality.

The second object is the evolution of a process for drying prunes which will render same more palatable and sanitary, and at the same time retain those natural characteristics of the prune commonly deemed desirable for mankind.

These, and other objects, will become more apparent from the specification following as illustrated in the accompanying drawing, in which.

Similar numbers of reference refer to similar parts throughout the views.

Figure 1:
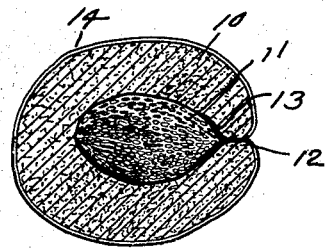
Fig. 1 is a sectional view through a prune.
Figure 2:
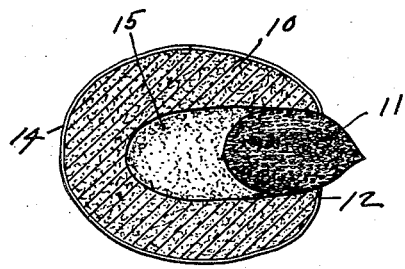
Fig. 2 is a similar view through the same prune from which the pit is being withdrawn from the stem end.

Before entering into a description of this invention it must be understood that the ordinary process for drying prunes consists of dipping same in a lye solution for the purpose of checking the skin, then subjecting the prune to currents of heated air until the moisture content thereof is sufficiently reduced. This action causes the moisture of the prune to escape through the checked skin surface affording an excellent means for catching any particles of lint or dust floating in the drying air.

While this method of drying is very quick, it can readily be seen that the dried fruit will be covered with a coating of foreign substances which adhere to the sticky surface of the prune. In order to secure this evaporation from the exterior of the prune at a speed which will make it commercially possible for the grower, lye is resorted to for the checking of the skin. While effective for this purpose it neutralizes the citric acid underneath the skin, eliminating from the prune that property for which it is best known.

It will be borne in mind that in the common process above described the pit remains in the dried fruit. Owing to the difficulty experienced in maintaining an even temperature within the driers certain prunes become over-heated, and when the only exit for the moisture is through the skin these result in a larger expanded prune, referred to as "swells", "bloats", etc., which reduce the average quality of the dried fruit.

With my process the prune is dried from the inside instead of from the outside and the juicy surface through which the drying takes place is finally sealed to exclude contaminating substances, and the exterior of the prune, namely the skin, which has not been checked is easily washable.

Referring in detail to the drawing, there is illustrated a common form of prune 10 having the pit 11, which is joined to the stem end 12 by a fibrous fastening 13. The skin 14 covers the fleshy portion of the prune. The interior 15 of the prune, which contacts with the pit 11, is the area from which the drying takes place.

Figure 3:
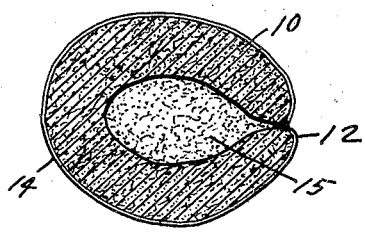
Fig. 3 is a view similar to Fig. 1 except that the pit has been removed.
Figure 4:
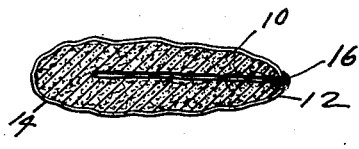
Fig. 4 is a section through the dried prune.

The steps of the process are as follows: The skin 14 of the prune 10 is first washed and the pit 11 is drawn from the stem end 12, which yields sufficiently for the purpose without tearing and returns after the pit 11 has been removed to the position shown in Fig. 3. It is now placed in a suitable drier and a temperature approximately the same as is now used is maintained over a slightly longer period of time, which is made necessary by the somewhat reduced evaporating area of the surface 15 as compared with the area of the skin 14. The juice 16 which issues from the mid portion of the prune 10 by way of the opening in the stem end 12 during the drying operation finally seals this opening when the drying operation is completed.

It must be understood that the juice does not actually run from this opening, but the evaporation takes place through this opening, which naturally leaves a sealing globule of juice 16 at the outlet opening.

While the drying operation in this process is somewhat longer than in the checked skin process briefly described herein, there is no comparison between the qualities of the dried prunes obtained thereby, and it is possible to wash clean the prunes dried by my process, which is not the case with the ordinary dried prune, as everyone is aware, since no matter how carefully these are washed it is impossible to fully remove the small particles of dirt, lint and grit which are firmly embedded in the sticky surface. It must be borne in mind that the skin of my dried prune is not sticky, due to the fact that the evaporation has taken place internally instead of externally, and that the evaporating surfaces are thoroughly protected against contamination the instant evaporation stops.

The particular manner of removing the pit is immaterial, it being possible to do so by either hand or machine so long as the pit is removed from an opening in the side of the prune, instead of slitting the prune open as has been practiced in domestic drying of certain other fruits.

As to the removal of the pit it is contemplated that the pit may be removed either from a single opening most advantageously positioned, or from a double opening caused by inserting an instrument through on side of the prune and projecting the pit from the opposite side thereof. In other words, whatever method is employed for removing the pit it must not expose the interior of the prune to contamination, and whatever opening is formed must be subject to self-sealing when the drying operation ceases.

I claim:

1. A process for drying fresh ripe prunes consisting of progressively removing the pit from a single opening, and then reducing the moisture of said prune by way of the opening formed for the exit of said pit.

2. A process for drying fresh ripe prunes consisting of progressively forming a single opening in the prune, then withdrawing the pit therefrom, and then subjecting the pitless prune to evaporating heat.

3. A method of drying fresh ripe prunes consisting of progressively forming an opening in the stem end of the prune, then removing the pit through said opening and then withdrawing a portion of the moisture content of said prune through said opening.

4. A process for drying fresh ripe prunes consisting of progressively forming a single opening in the prune previous to drying same, then removing the pit through said opening and then evaporating said prune through said opening.

ALBERT H. BOYD.